(12) United States Patent
Raguillat et al.

(10) Patent No.: US 9,767,434 B2
(45) Date of Patent: Sep. 19, 2017

(54) IDENTIFYING CONTACTS

(75) Inventors: Fred Raguillat, Dunboyne (IE); Colm Farrell, Clonsilla (IE); Liam Harpur, Skerries (IE); Patrick Joseph O'Sullivan, Ballsbridge (IE); Hema Srikanth, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 574 days.

(21) Appl. No.: 12/500,110

(22) Filed: Jul. 9, 2009

(65) Prior Publication Data

US 2011/0010381 A1   Jan. 13, 2011

(51) Int. Cl.
*G06F 17/30* (2006.01)
*G06Q 10/10* (2012.01)
*H04L 12/58* (2006.01)

(52) U.S. Cl.
CPC ....... *G06Q 10/10* (2013.01); *G06F 17/30657* (2013.01); *H04L 51/28* (2013.01); *H04L 51/32* (2013.01)

(58) Field of Classification Search
CPC ................ G06F 17/30699; G06F 17/30867
See application file for complete search history.

(56) References Cited

U.S. PATENT DOCUMENTS

| | | | |
|---|---|---|---|
| 6,990,495 B1 * | 1/2006 | Grason et al. | |
| 7,996,392 B2 * | 8/2011 | Liao ................. | G06F 17/30699 707/723 |
| 2002/0078050 A1 * | 6/2002 | Gilmour ............ | G06F 17/3061 |
| 2010/0017484 A1 * | 1/2010 | Accapadi ........... | G06Q 10/107 709/206 |
| 2010/0299348 A1 * | 11/2010 | Gill et al. ................ | 707/769 |
| 2010/0312837 A1 * | 12/2010 | Bodapati et al. .......... | 709/206 |

* cited by examiner

*Primary Examiner* — Son T Hoang
(74) *Attorney, Agent, or Firm* — Cuenot, Forsythe & Kim, LLC (57) ABSTRACT

The present disclosure may include receiving a query from a computing device at a server having a database, the query identifying a desired attribute. The present disclosure may also include searching the database to identify contact information for at least one individual having the attribute corresponding to the query. The attribute may include at least one of skills, expertise, product, organization, geography and language The contact information may be transmitted to the computing device via an electronic message identifying the contact information.

12 Claims, 6 Drawing Sheets

502 receiving a query from a computing device at a server having a database, the query identifying a desired attribute

504 searching the database to identify contact information for at least one individual having the attribute corresponding to the query, the attribute including at least one of skills, expertise, product, organization, geography and language

506 transmitting the contact information to a computing device using an electronic message

508 determining a rating of at least one of a plurality of individuals having the attribute and a plurality of groups having the attribute

510 selecting the at least one individual based upon, at least in part, the rating

FIG. 6

IDENTIFYING CONTACTS

BACKGROUND

This disclosure relates to a system and method for identifying contacts and, more particularly, to a system and method for sorting contacts according to an organizational or social networking database.

Today, email may be used as a general tool for broad collaboration. Email has led to an explosion of messaging in which many people communicate and share content. However, the mechanisms that we have to send, receive and process email do not lend themselves to successful collaboration in a broader context.

In corporate environments it is often the case that someone may be searching for the "right person" to help resolve an outstanding issue facing the company. These issues may be related to any issue facing the company, such as a process, product, or even an issue with a customer. Typically, the person searching may rely upon his/her immediate network of contacts to identify the "right person" for the task. Unfortunately, merely resorting to that person's immediate network of contacts may result in a time-consuming process, which may not yield the best results.

BRIEF SUMMARY

In a first implementation, a computer-implemented method may include receiving a query from a computing device at a server having a database, the query identifying a desired attribute. The method may also include searching the database to identify contact information for at least one individual having the attribute corresponding to the query, the attribute including at least one of skills, expertise, product, organization, geography and language. The method may further include transmitting the contact information to a computing device using an electronic message including the contact information.

In a second implementation, a computer program product comprising a computer readable storage medium having computer readable program code embodied therewith is provided. The computer-readable program code may be configured to receive a query from a computing device at a server having a database, the query identifying a desired attribute. The computer-readable program code may also be configured to search the database to identify contact information for at least one individual having the attribute corresponding to the query. The attribute may include at least one of skills, expertise, product, organization, geography and language. The computer-readable program code may be further configured to transmit the contact information to the computing device using an electronic message including the contact information.

In a third implementation a computing system is provided. The computing system may include a processor and a memory architecture coupled with the processor. The computing system may also include a first software module executed on the processor and the memory architecture, wherein the first software module is configured to transmit a query from a computing device to a server having a database, the query identifying a desired attribute. The computing system may further include a second software module executed on the at least one processor and the at least one memory architecture, wherein the second software module is configured to receive contact information for at least one individual having the attribute corresponding to the query. The attribute may include at least one of skills, expertise, product, organization, geography and language. Additionally, the computing system may also include a third software module executed on the at least one processor and the at least one memory architecture, wherein the third software module is configured to generate an ordered rating based upon, at least in part, the contact information.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings may indicate like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of aspects of the present invention may be written in an object oriented programming language such as Java, Smalltalk, C++ or the like. However, the computer program code for carrying out operations of aspects of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
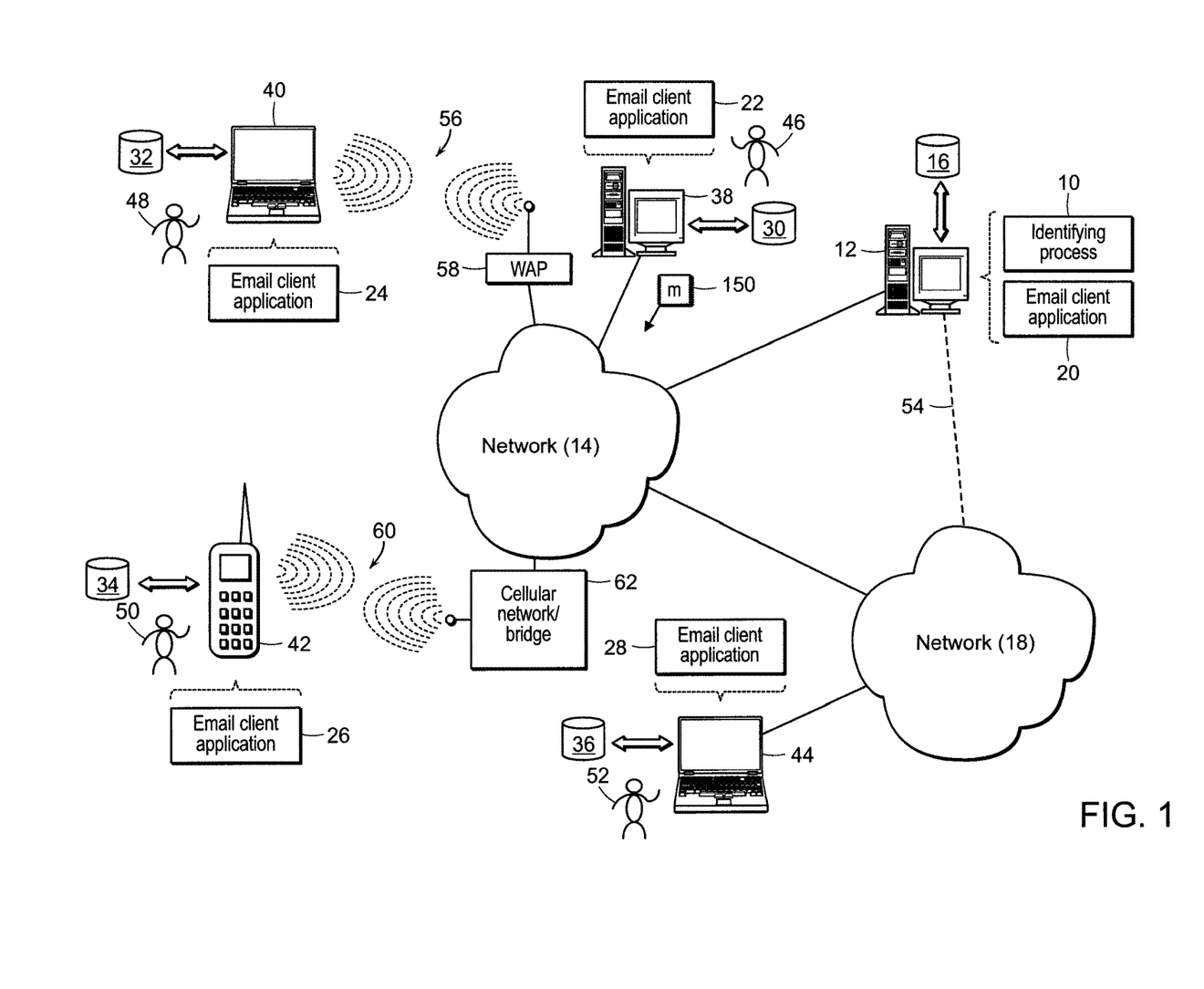
FIG. 1 is a diagrammatic view of an identifying process and an email client application coupled to a distributed computing network.

Referring to FIG. 1, there is shown identifying process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example. As will be discussed below in greater detail, identifying process 10 may include receiving a query at a server having a database and searching the database to identify contact information for at least one individual having an attribute corresponding to the query. The method may further include transmitting the contact information to a computing device.

The instruction sets and subroutines of identifying process 10, which may be stored on storage device 16 coupled to server computer 12, may be executed by one or more processors (not shown) and one or more memory architectures (not shown) incorporated into server computer 12. Storage device 16 may include, but is not limited to, a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include, but are not limited to, a local area network; a wide area network; or an intranet, for example.

Server computer 12 may execute email server application 20, examples of which may include, but are not limited to, e.g., IBM® Lotus® Domino® Server and Microsoft Exchange® Server (IBM, Lotus, and Domino are registered trademarks of International Business Machines Corporation in the United States, other countries or both; Exchange is a registered trademark of Microsoft Corporation in the United States, other countries or both). Email server application 20 may be a mail transfer agent that may store and route email to one or more email client applications 22, 24, 26, 28, examples of which may include but are not limited to Lotus Notes® and Microsoft Outlook® (Lotus Notes is a registered trademark of International Business machines Corporation in the United States, other countries, or both; and Outlook is a registered trademark of Microsoft Corporation in the United States, other countries, or both). Identifying process 10 may be a stand alone application that interfaces with email server application 20 or an applet/application that is executed within email server application 20.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include, but are not limited to, hard disk drives, tape drives, optical drives, RAID arrays, random access memories (RAM), read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

This disclosure is directed towards an identifying process 10 configured to receive a query, from a computing device, at a server having a database and to search the database to identify contact information for at least one individual having an attribute corresponding to the query. The attribute may include at least one of skills, expertise, product, organization, geography and language. Identifying process 10 may further include transmitting the contact information to the computing device.

Identifying process 10 may be a server-side process, a client-side process, or a hybrid server-side/client-side process. Accordingly and for the following disclosure, identifying process 10 shall collectively refer to any and all combinations of server-side identifying process 10 and/or client-side identifying processes.

For example, server-side identifying process 10 may reside on and may be executed by server computer 12, which may be connected to network 14 (e.g., the Internet or a local area network). Examples of server computer 12 may include, but are not limited to, a personal computer, a server computer, a series of server computers, a mini computer, and a mainframe computer. Server computer 12 may be a web server (or a series of servers) running a network operating system, examples of which may include but are not limited to, Microsoft® Windows® XP Server; Novell® NetWare®; or Red Hat® Linux®, for example.

For the following discussion, email client application 22 is going to be described for illustrative purposes. However, this is not intended to be a limitation of this disclosure, as other email client applications (e.g., email client applications 24, 26, 28) may be equally utilized.

In the past, a corporate employee may have had difficulties locating the proper individual for help with a particular matter. For example, an employee who works as part of a development team may have a conference call scheduled with an important customer to discuss the current product issues encountered with a particular product. Here, the employee may want the assistance of a software engineer in the support group that may be able to assist him/her in answering some of the questions regarding the product. It may be likely, however, that the employee does not know anyone in the support group. The employee may then be forced to "ask around" to his/her coworkers to try to locate the desired individual. This type of situation could possibly take days or even weeks to locate the correct individual.

Figure 2:
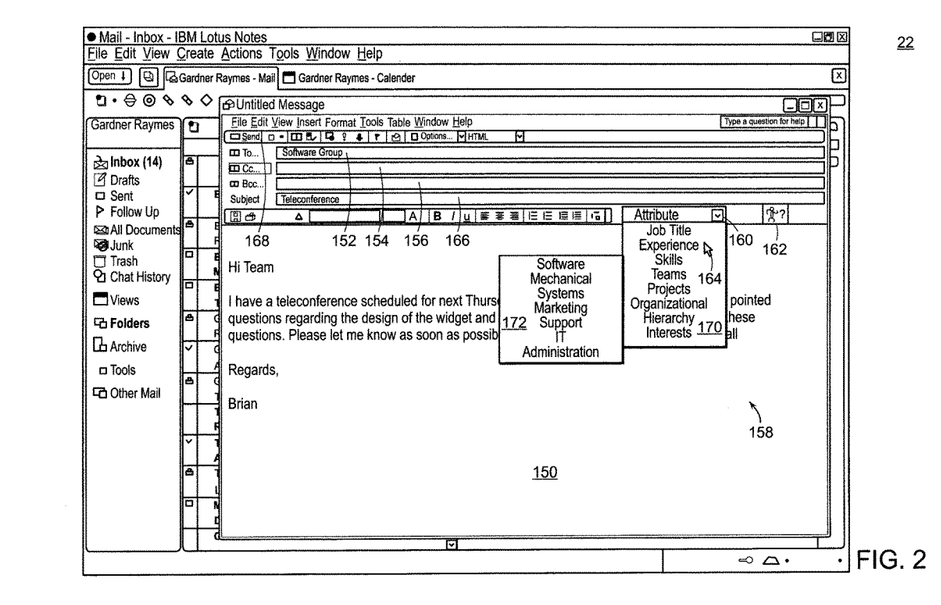
FIG. 2 is a diagrammatic view of a display screen rendered by the identifying process and/or email client application of FIG. 1.

Identifying process 10 may be used in a variety of different situations such as the one described above, to identify the desired individual in a quick and efficient manner. Referring also to FIG. 2, email client application 22 (alone or in combination with identifying process 10 and/or email server application 20) may allow a user (e.g., user 46) to generate and/or transmit email message 150 that may be addressed to one or more attributes. Email message 150 may be addressed using various addressing fields, e.g., "TO" recipients 152, "CC" (i.e., carbon copy) recipients 154, and "BCC" (i.e., blind carbon copy) recipients 156. Further, email message 150 may include message content 158 (i.e., the body of the email message). Email message 150 may include attribute search tool 160 and/or attribute selector 162, which when activated, may allow a user, through identifying process 10, to generate a query to identify contact information for a specific individual or group of individuals having an attribute corresponding to the query. The term "attribute" as described herein may refer to an individual's Job Title, Experience, Skills, Team Membership, Projects, Organizational Hierarchy, Interests, Technical Background, Product, Geography, Language, etc.

Identifying process 10 may be configured to permit communication between a number of computing devices, for example, between client device 38 and server 12. In this way, server 12 may be configured to receive a query from client device 38 at server 12. Server 12 may include contact information, which may be stored in a document, database or any other suitable file or storage device. In some embodiments, the query may be generated by client device 38 and received by server 12. Identifying process 10 may be configured to search the database associated with server 12 to identify contact information for at least one individual having an attribute corresponding to the query, the attribute including at least one of skills, expertise, product, organization, geography and language. Identifying process 10 may further include transmitting the contact information to client device 38.

In operation, a user, e.g., user 46 shown in FIG. 1 may wish to locate an individual having a particular attribute, e.g., software engineering experience. As such, identifying process 10 may allow user 46 to locate an individual (e.g., software engineer) within his/her company without originally knowing the person's name. For example, user 46 may select attribute search tool 160 and/or attribute activator 162 to activate identifying process 10. User 46 may select one or more attributes from drop-down 170 menu shown corresponding to attribute search tool 160. In this example, user 46 may select the "Expertise" option from drop-down menu 170. User 46 may then be prompted to enter and/or select the specific type of experience that he/she desires in the sought individual. For example, user 46 may select the "Expertise" option from drop-down menu 170 of attribute search tool 160 using pointer 164. Once the "Expertise" option has been selected an additional drop-down menu 172 may be provided, thus showing a list of all of different types of "Expertise" available.

Alternatively and/or additionally, user 46 may indicate the type of expertise required using, for example, "TO" field 152. In some embodiments, identifying process 10 may automatically populate "TO" field 152 with the term "software" once selected, or alternatively, user 46 may enter this term into "TO" field 152 or any of fields 152, 154, 156, and/or 166. The relevant fields may be populated with all selected attributes with the embedded ranking/importance of the attribute.

Although, attribute search tool 160 is shown in FIG. 2 as a drop-down menu, it should be noted that identifying process 10 may be activated using any suitable technique. For example, identifying process 10 may be activated using right-click activation, keystroke entry, button selection and/or alternative selection tools associated with email client application 22, etc.

Once the desired attribute has been selected by user 46, user 46 may decide to send a query using, for example, attribute activator 162 and/or "send" button 168. Once selected, identifying process 10 may then generate and/or transmit the query from client device 38, which may be received by server 12. Server 12 may then search for contact information corresponding to one or more individuals who have experience in the software group. Once this information has been obtained it may be transmitted back to client device 38 for review.

Figure 3:
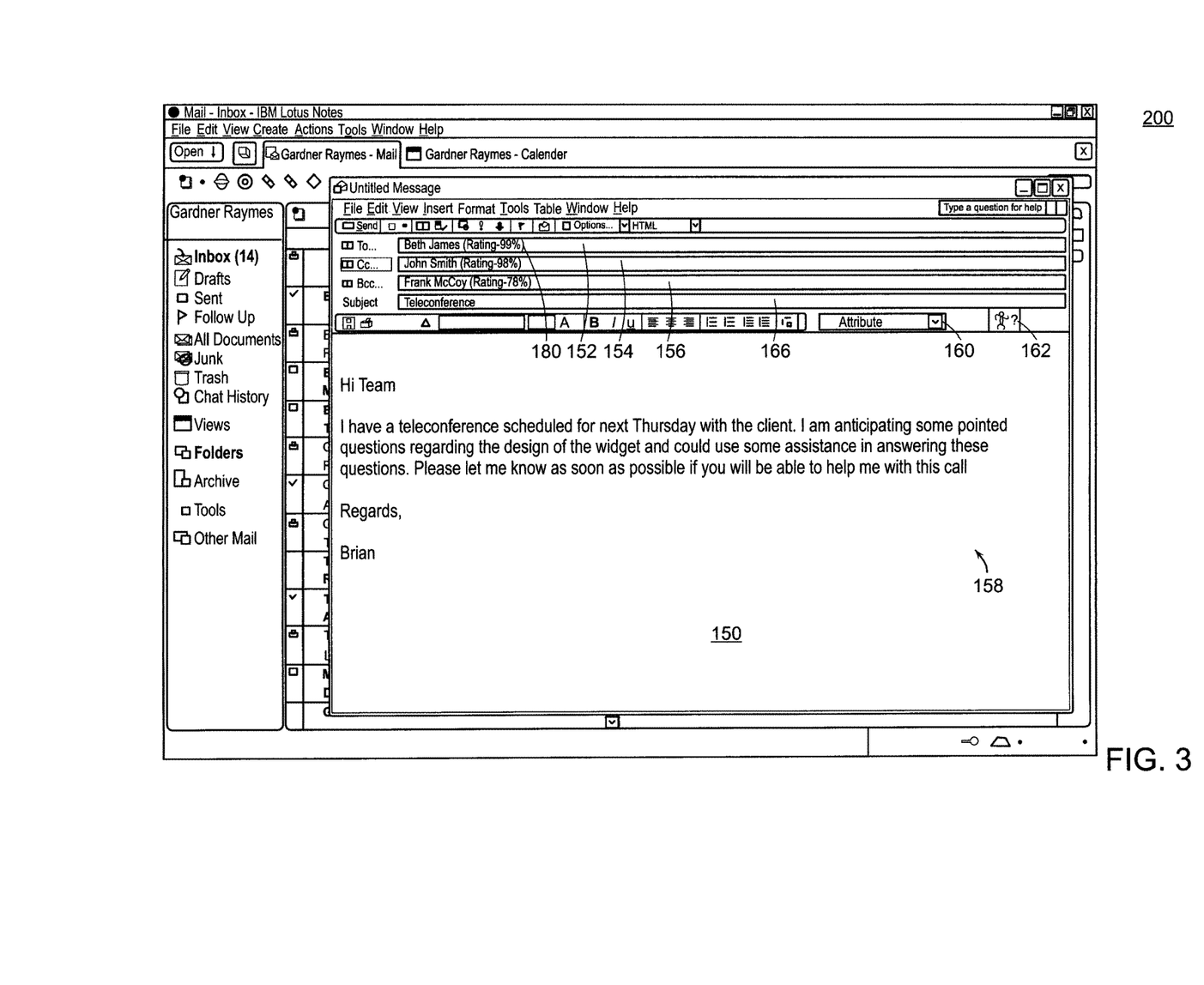
FIG. 3 is a diagrammatic view of a display screen rendered by the identifying process and/or email client application of FIG. 1.

Referring now to FIG. 3, client device 38 may then receive the contact information from server 12 and display the results to user 46 via email client application 200. User 46 may then review the results for the most suitable individual and may then compose and/or transmit message 150 to the identified individual using the supplied contact information. Although much of the discussion contained herein has been in the context of email messaging, the present disclosure is not limited to such applications, as the embodiments described herein may be applied to instant messaging, short message service (SMS) messaging, paging, etc.

In some embodiments, identifying process 10 may provide a rating 180 for review by the user. As shown in FIG. 3, rating 180 may be provided in fields 152, 154, 156, etc. Moreover, identifying process 10 may provide the rated individuals in an order, such as that shown in FIG. 3. For example, the highest rated individual may be automatically populated in "TO" field 152, the next highest in "CC" field 154, etc. Here, since Beth James is rated at 99% her name is populated in "TO" field 152 as the default selection. However, identifying process 10 may also allow for user-editable functionality. Thus, a user such as user 46 may be provided with an extensive listing of individuals having the attributes requested by the initial query. This listing may be provided to the user using any suitable technique. Once the user has selected his/her choice the individual's name and/or email address may be populated in the fields as described above. In some embodiments, server 12 may use the rating to select the one or more individuals whose contact information may be transmitted back to client device 38. The rating may be assigned based upon feedback from other users, the level of match between the query and the contact information of the individual, how the individual rates themselves, etc. For example, the rating may correspond to a matching percentage of the individuals' skills, expertise, product, organization, geography and language with the original query. That is, an identified individual having the requisite technical skills in a foreign office of the corporation may receive a less favorable rating than an identified individual having the requisite skills who operates out of the same office as the original user. Once the task has been completed, the user may provide feedback to the system, i.e., he/she may then rate the individual, which may be used by identifying process 10 to update the system and to improve its accuracy.

In some embodiments, identifying process 10 may be configured to identify individuals in accordance with an organizational hierarchy or database. The organizational hierarchy may include a corporate directory or similar feature that may map the reporting lines and organizational relationships between employees of a company. For example, in some embodiments, a lightweight directory access protocol (LDAP) or similar application protocol may be used to query and/or modify a hierarchical directory structure. In this way, identifying process 10 may provide a way of communicating with an LDAP server to determine the correct group of individuals and/or group name, as well as the order in which group of contacts 162 are displayed e.g., in address fields 152, 154, and 156. Identifying process 10 may also be configured to display the group of individuals at a computing device, e.g., computing device 38.

Alternatively, and/or additionally, in some embodiments, identifying process 10 may be configured to operate in accordance with a social networking system. The social networking system may be capable of mapping, for example, the user's $1^{st}$, $2^{nd}$, and $3^{rd}$ level of relationships between the users of the email network based on the frequency and nature of their interactions. Some exemplary social networking systems include, but are not limited to Facebook® and LinkedIn®, which may utilize a gated access approach to connect different users through various levels of relationships (LinkedIn® is a registered trademark of Linkedin Corp. in the United States, other countries, or both; Facebook® is a registered trademark of Facebook, Inc. in the United States, other countries, or both). In any of the embodiments described herein, the user may specify where to send the query and/or where to obtain the contact information, for example, to an organizational database as described above or alternatively using a social networking site such as LinkedIn®. Of course, identifying process 10 may be used in accordance with any suitable database and/or file storing system. In other words, the location of contact information is not limited to the examples described herein.

Figure 4:
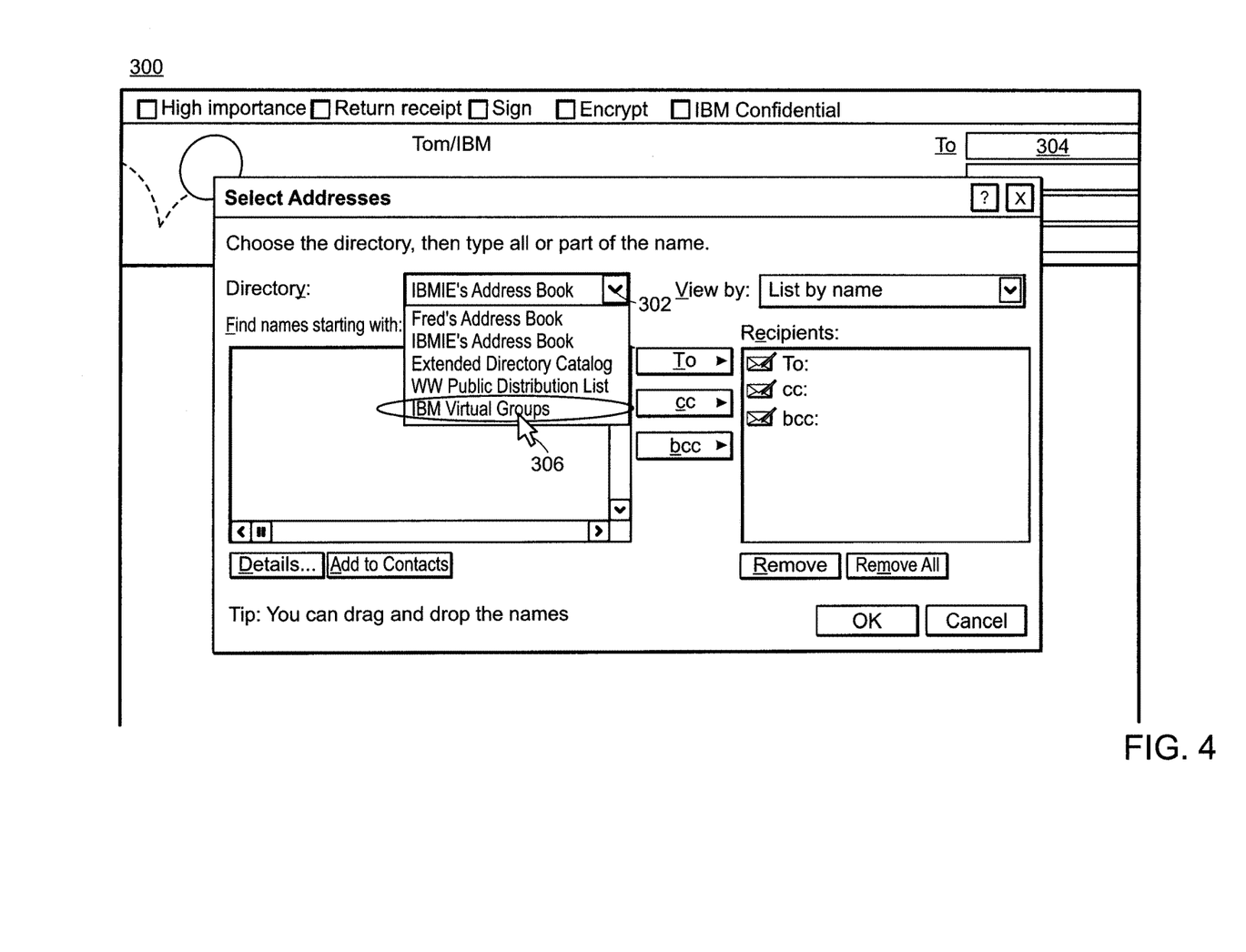
FIG. 4 is a diagrammatic view of a display screen rendered by the identifying process and/or email client application of FIG. 1.

Referring now to FIG. 4 another embodiment depicting a display screen 300 is shown in accordance with identifying process 10. Display screen 300 may allow a user to select a group from a directory 302. Directory 302 may be configured to provided a communication link between the user's computing device, e.g. client device 38, and the database or repository that includes the contact information for the individual having the attribute or attributes desired by the user. As shown in FIG. 4, this contact information may be located, for example, in server 12 and may be associated with a corporate directory such as an LDAP directory or a social networking application such as LinkedIn®.

In operation, the user may select "TO" field 304 to indicate that he/she wishes to compose a message. This may be achieved by selecting a button, right-clicking, etc. Once the user has activated identifying process 10, he/she may select an option from directory 302. For example, the user may select the "Virtual Groups" option from directory 302 using pointer 306 or other suitable methods.

Figure 5:
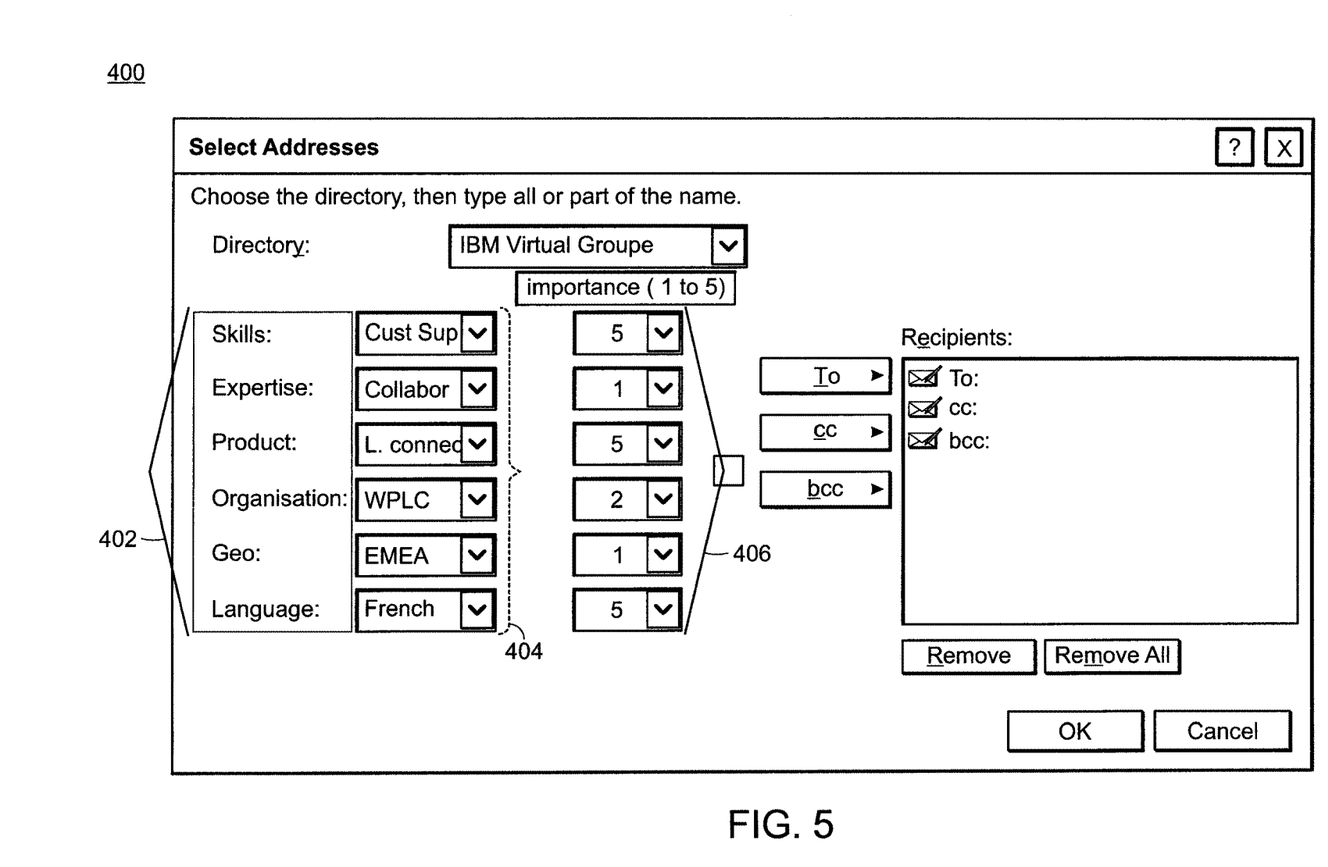
FIG. 5 is a diagrammatic view of a display screen rendered by the identifying process and/or email client application of FIG. 1.

Referring now to FIG. 5, a display screen 400 depicting a "Virtual Groups" directory in accordance with identifying process 10 is shown. Display screen 400 includes a plurality of attributes 402. As discussed above, attributes 402 may include, but are not limited to, an individual's Job Title, Experience, Skills, Team Membership, Projects, Organization and/or Organizational Hierarchy, Interests, Technical Background, Product, Geography, Language, etc. Display screen 400 may provide the user with an option to select at least one specific attribute from a plurality of attribute fields 404. The selection of one or more attributes may allow a sender to pinpoint the relevant person or persons without knowing who to contact. As shown in FIG. 5, attribute fields 404 may be presented using a drop-down menu or any other suitable technique. For example, the user may desire assistance from someone who can speak French who works in customer support. Additionally, display screen 400 may include a weighting feature 406. Weighting feature 406 may allow a user to indicate the importance attached to each of the attributes selected. For example, a user may attach a more significant importance upon locating someone who is in customer support and who speaks French, than that person's location. In this way, the user may select the "5" weighting for the language and skills attributes, while only selecting a "1" weighting for the geography attribute as shown in FIG. 5.

Identifying process 10 may then send the query, as discussed above, using weighting feature 406. Weighting feature 406 may function as a guide for identifying process 10 in locating the contact information for the most suitable individual in accordance with the selected weighting factors. In some embodiments, any or all of the components shown in display screen 400 may be configurable using any number of suitable techniques. For example, attributes 402 and attribute fields 404 may be user-configurable, configurable by an administrator, and/or a combination of both the user and an administrator. Similarly, weighting feature 406 may also be configurable in the same manner.

As discussed above, identifying process 10 may operate as a client-side, server-side or hybrid client-server side process. The query may be transmitted from a computing device and/or received at the computing device, for example, computing device 38. Thus, in some embodiments, the query may be composed at a client device and transmitted to a server for subsequent searching and/or identification of individuals having attributes corresponding to the query.

Figure 6:
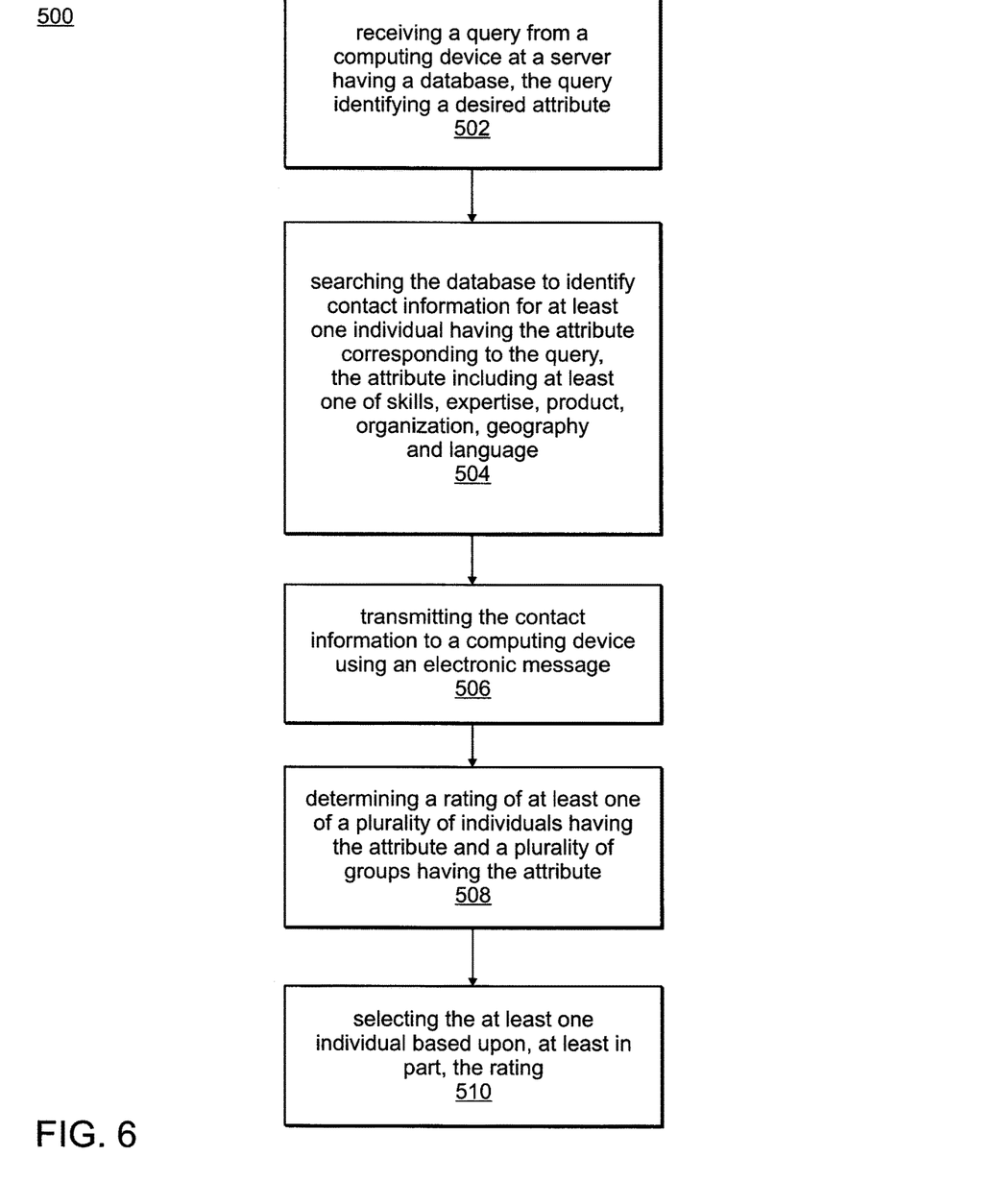
FIG. 6 is a flowchart depicting operations in accordance with the identifying process described herein.

Referring now to FIG. 6, a method 500 depicting operations in accordance with identifying process 10 is provided. Operations may include receiving a query from a computing device at a server having a database, the query identifying a desired attribute (502). Operations may also include searching the database to identify contact information for at least one individual having the attribute corresponding to the query, the attribute including at least one of skills, expertise, product, organization, geography and language (504). Operations may additionally include transmitting an electronic message including the contact information to the computing device (506). Operations may further include determining a rating of each of a plurality of individuals having the attribute (508). Operations may also include selecting the at least one individual based upon, at least in part, the rating (510). Numerous additional operations are also envisioned without departing from the scope of the present disclosure.

The flowchart and block diagrams in the Figures illustrate the architecture, functionality, and operation of possible implementations of systems, methods and computer program products according to various embodiments of aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A number of implementations have been described. Nevertheless, it will be understood that various modifications may be made. Accordingly, other implementations are within the scope of the following claims. For example, and as discussed above, although most of the discussion contained herein has focused upon email messages, this disclosure is not limited to these examples, as the identifying process described herein may be applied to calendar invitations and various other forms of messaging.

What is claimed is:

1. A computer-implemented method for transmitting an email, comprising:
   presenting to a user, by an email client application, a plurality of pre-defined attributes of contacts associated with the user;
   receiving, from the user and within the email client application, a selection of at least two of the plurality of pre-defined attributes;
   receiving, from the user and within the email client application, a weight for each of the at least two selected pre-defined attributes;
   forwarding, by the email client application and using the at least two selected pre-defined attributes and associated selected weights, a query to an email server;
   receiving, from the email server and based upon the query, a plurality of contacts matching the query and associated contact email addresses of the plurality of contacts;
   receiving, from the user and within the email client application, a selection of at least one of the plurality of contacts;
   automatically populating, by the email client application, an address field of the email with an email address associated with the selected at least one contact; and
   transmitting, to the selected at least one contact, by the mail client application, the email using the email address.

2. The computer-implemented method of claim 1, wherein
   each of the received plurality of contacts includes a rating associated therewith, and
   each rating is based upon the at least two selected pre-defined attributes and corresponding selected weights.

3. The computer-implemented method of claim 2, wherein the address field of the email is automatically populated in the email client application with a highest-rated one of the received plurality of contacts.

4. The computer-implemented method of claim 1, wherein at least one of the plurality of pre-defined attributes is, is skills, expertise, product, organization, geography, or language.

5. A computer hardware system for transmitting an email, comprising:
   at least one hardware processor, wherein the at least one hardware processor is configured to perform:
      presenting to a user, by an email client application, a plurality of pre-defined attributes of contacts associated with the user;
      receiving, from the user and within the email client application, a selection of at least two of the plurality of pre-defined attributes;
      receiving, from the user and within the email client application, a weight for each of the at least two selected pre-defined attributes;
      forwarding, by the email client application and using the at least two selected pre-defined attributes and associated selected weights, a query to an email server;
      receiving, from the email server and based upon the query, a plurality of contacts matching the query and associated contact email addresses of the plurality of contacts;
      receiving, from the user and within the email client application, a selection of at least one of the plurality of contacts;
      automatically populating, by the email client application, an address field of the email with an email address associated with the selected at least one contact; and
      transmitting, to the selected at least one contact, by the mail client application, the email using the email address.

6. The computer hardware system of claim 5, wherein
   each of the received plurality of contacts includes a rating associated therewith, and
   each rating is based upon the at least two selected pre-defined attributes and corresponding selected weights.

7. The computer hardware system of claim 6, wherein an address field of the email is automatically populated in the email client application with a highest-rated one of the received plurality of contacts.

8. The computer hardware system of claim 5, wherein at least one of the plurality of pre-defined attributes is skills, expertise, product, organization, geography, or language.

9. A computer program product, comprising a storage hardware device having stored therein computer usable instructions for transmitting an email, the computer usable instructions, which when executed by a computer hardware system, cause the computer hardware system to perform:
   presenting to a user, by an email client application, a plurality of pre-defined attributes of contacts associated with the user;
   receiving, from the user and within the email client application, a selection of at least two of the plurality of pre-defined attributes;
   receiving, from the user and within the email client application, a weight for each of the at least two selected pre-defined attributes;
   forwarding, by the email client application and using the at least two selected pre-defined attributes and associated selected weights, a query to an email server;
   receiving, from the email server and based upon the query, a plurality of contacts matching the query and associated contact email addresses of the plurality of contacts;
   receiving, from the user and within the email client application, a selection of at least one of the plurality of contacts;
   automatically populating, by the email client application, an address field of the email with an email address associated with the selected at least one contact; and
   transmitting, to the selected at least one contact, by the mail client application, the email using the email address.

10. The computer program product of claim 9, wherein
    each of the received plurality of contacts includes a rating associated therewith, and
    each rating is based upon the at least two selected pre-defined attributes and corresponding selected weights.

11. The computer program product of claim 10, wherein an address field of the email is automatically populated in the email client application with a highest-rated one of the received plurality of contacts.

12. The computer program product of claim 9, wherein at least one of the plurality of pre-defined attributes is skills, expertise, product, organization, geography, or language.

* * * * *